US012577995B2

(12) United States Patent
Jung et al.

(10) Patent No.: US 12,577,995 B2
(45) Date of Patent: Mar. 17, 2026

(54) BRAKE LOCKING APPARATUS

(71) Applicant: HL Mando Corporation,
Pyeongtaek-si (KR)

(72) Inventors: Daejune Jung, Seongnam-si (KR);
Woochul Lim, Yongin-si (KR);
Joon-Kyu Song, Seongnam-si (KR)

(73) Assignee: HL Mando Corporation,
Pyeongtaek-si (KR)

( * ) Notice: Subject to any disclaimer, the term of this
patent is extended or adjusted under 35
U.S.C. 154(b) by 326 days.

(21) Appl. No.: 18/320,419

(22) Filed: May 19, 2023

(65) Prior Publication Data

US 2023/0375058 A1     Nov. 23, 2023

(30) Foreign Application Priority Data

May 20, 2022     (KR) ........................ 10-2022-0061814

(51) Int. Cl.
*F16D 65/14*      (2006.01)
*F16D 127/06*     (2012.01)
(52) U.S. Cl.
CPC .......... *F16D 65/14* (2013.01); *F16D 2127/06*
(2013.01)
(58) Field of Classification Search
CPC ............................ F16D 65/14; F16D 2127/06
USPC ........................ 188/72.1, 72.3, 156–164, 265
See application file for complete search history.

(56) References Cited

U.S. PATENT DOCUMENTS

| 9,051,982 | B2 * | 6/2015 | Park | ........................ F16D 65/18 |
| 9,340,194 | B2 * | 5/2016 | Giering | ................... F16D 65/18 |

FOREIGN PATENT DOCUMENTS

| DE | 102012208294 A1 * | 11/2012 | ........... F16D 41/206 |
| KR | 20210097858 A | 8/2021 | |

OTHER PUBLICATIONS

Korean Office Action corresponding to Korean Application No.
10-2022-0061814 (Foreign Text, 4 pages; English 1 translation
thereof, 5 pages) (mailed Dec. 18, 2025).

* cited by examiner

*Primary Examiner* — Christopher P Schwartz
(74) *Attorney, Agent, or Firm* — Myers Bigel, P.A.

(57) ABSTRACT

A brake locking apparatus for locking the position of a brake
pad in a vehicle, the brake locking apparatus may include:
a housing; a first rotating member including: a first body part
inside the housing configured to rotate in conjunction with
movement of the brake pad, and a first protrusion including
a first support surface extending radially outwardly from a
first side of the first body part, wherein the first body part is
cylindrical; and an elastic member including: a spring part
positioned on a circumferential side of the first body part and
having an outer circumferential surface adjacent an inner
surface of the housing, and a first bent part bent inwardly at
a first end of the spring part to elastically support the first
support surface.

15 Claims, 15 Drawing Sheets

BRAKE LOCKING APPARATUS

RELATED APPLICATIONS

This application claims priority under 35 U.S.C. § 119 to Korean Patent Application No. 10-2022-0061814, filed May 20, 2022, the disclosure of which is hereby incorporated by reference in its entirety.

FIELD

The present invention relates to a brake locking apparatus, and more particularly, to a brake locking apparatus capable of maintaining an operating state of a brake by locking a position of a brake pad provided in a vehicle.

BACKGROUND

A brake is an apparatus for controlling vehicle speed or parking and stopping a vehicle, and generally comprises a brake disc fixed to a wheel of a vehicle and that rotate together, and a brake pad limiting the rotation of the wheel by pressing a side surface of the brake disc so that frictional force can be generated.

The brake locking apparatus is an apparatus that maintains an operating state of the brake by locking the relative position of the brake pad and the brake disc. For example, the brake locking apparatus can lock the position of the brake pad so that the brake pad may continuously press the brake disc, thereby maintaining the brake in an active state. The brake locking apparatus is mainly used to prevent the wheel of a parked or stopped vehicle from rotating by itself.

This brake locking apparatus is configured to generate and maintain a parking force (hereafter, a locking force) to press the brake pad toward the brake disc, thereby keeping the brake active. In this case, as the weight of the vehicle body increases, such as a large truck, or as the slope of the ground on which the vehicle is parked becomes steeper, the required locking force increases.

However, the conventional brake locking apparatus has a problem in that it cannot generate a large locking force for parking of a large vehicle, or the load applied to the brake locking apparatus exceeds the permitted range.

Therefore, there has been a pressing need to develop a brake locking apparatus capable of efficiently generating a sufficiently large locking force while minimizing the load applied to the apparatus.

SUMMARY

The present invention is to solve the above problems, and an object of the present invention is to provide a brake locking apparatus capable of efficiently generating a locking force for maintaining an operating state (e.g., active state) of the brake.

Another object of the present invention is to provide a brake locking apparatus capable of minimizing the load applied to the apparatus to generate a locking force.

The objects of the present invention are not limited to the above-mentioned objects, and other objects not mentioned will be clearly understood by those skilled in the art from the following description.

According to one aspect of the present invention, there is provided a brake locking apparatus for locking a position of a brake pad in a vehicle, the brake locking apparatus including: a housing; a first rotating member including: a first body part inside the housing configured to rotate in conjunction with movement of the brake pad, and a first protrusion including a first support surface extending radially outwardly from a first side the first body part, wherein the first body part is cylindrical; and an elastic member including: a spring part positioned on a circumferential side of the first body part and having an outer circumferential surface adjacent an inner surface of the housing, and a first bent part bent inwardly at a first end of the spring part to elastically support the first support surface.

Here, the first protrusion may include a second support surface extending radially outwardly from a second side of the first body, and the elastic member may include a second bent part bent inwardly at a second end of the spring part to elastically support the second support surface.

An arc length defined between the first support surface and the second support surface may be greater than an arc length defined between the first bent part and the second bent part.

The first protrusion may be on a first portion of the circumferential side of the first body part and extends along a circumferential direction of the first body part, wherein the first protrusion may have an arc shape; wherein an operating space may be defined on a second portion of the circumferential side of the first body part between the first support surface and the second support surface and extends along the circumferential direction of the first body part, and wherein the first bent part and the second bent part may be in the operating space.

The first end of the spring part may extend in a circumferential direction along an outer circumferential portion of the operating space in a first direction toward the first bent part; and the second end of the spring part may extend along the outer circumferential portion of the operating space in a second direction opposite the first direction toward the second bent part.

The brake locking apparatus may further comprise: a second rotating member configured to rotate the first rotating member to move the brake pad; an actuator configured to generate a driving force to rotate the second rotating member; and a power transmission member configured to transmit the driving force generated by the actuator to the second rotating member.

Here, the power transmission member may include a worm wheel and a worm gear.

The second rotating member may include a second body part coupled to the power transmission member and a second protrusion extending from the second body part to an inner circumferential side of the spring part, and wherein the second protrusion may include a first pressing surface configured to press and rotate the first bent part and the first protrusion.

The second protrusion may have an arc shape, and the first end of the spring part may extend in the circumferential direction along an outer circumferential surface of the second protrusion.

The first rotating member may include a coupling part extending from the first body part, and the second body part may include a through hole through which the coupling part extends.

The second protrusion may extend along a circumference of the through hole.

The elastic member, the first rotating member and the second rotating member may be coaxially arranged around a rotation axis.

The first protrusion may include a second support surface extending radially outwardly from a second side of the first body part, the elastic member may include a second bent part bent inwardly at a second end of the spring part to elastically support the second support surface, and the second protrusion may include a second pressing surface configured to press and rotate the second bent part and the first protrusion.

The second protrusion may include a hooking part extending in a radial direction further than an outer diameter of the spring part, and wherein the hooking part may be adjacent the elastic member to support the elastic member.

The first protrusion may include a hooking part extending in a radial direction further than an outer diameter of the spring part, and wherein the hooking part may be adjacent the elastic member to support the elastic member.

The first bent part may be perpendicular to an inner circumferential surface of the spring part.

An installation groove may be defined in an inner wall of the housing, and the elastic member may be press-fitted and installed inside the installation groove.

In this case, a friction member may be provided on the inner surface of the housing to increase a frictional force between the outer circumferential surface of the elastic member and the inner surface.

The brake locking apparatus may further comprise a planetary gear part coupled to each of the first rotating member and the brake pad.

According to the above configuration, the brake locking apparatus according to an embodiment of the present invention is configured such that the outer circumferential surface of the spring part is adjacent or in contact with the inner surface of the housing, whereby as a force by which the first rotating member presses the bent part increases, a frictional force between the spring part and the housing increases, and thus, a force by which the bent part supports the first rotating member may increase. Therefore, the brake locking apparatus according to an embodiment of the present invention can efficiently generate a locking force required to maintain an operating state of the brake.

In addition, the brake locking apparatus according to an embodiment of the present invention is configured such that the bent part bent toward the inside of the spring part and sufficiently spaced from the center supports and fixes the first rotating member, whereby even if a small force is applied to the bent part, a relatively large torque may be generated. Therefore, the brake locking apparatus according to an embodiment of the present invention can minimize a load applied to the apparatus as the locking force is generated.

It should be understood that the effects of the present invention are not limited to the above effects, and include all effects that can be inferred from the configuration of the invention described in the detailed description or claims of the present disclosure.

DETAILED DESCRIPTION

Figure 1:
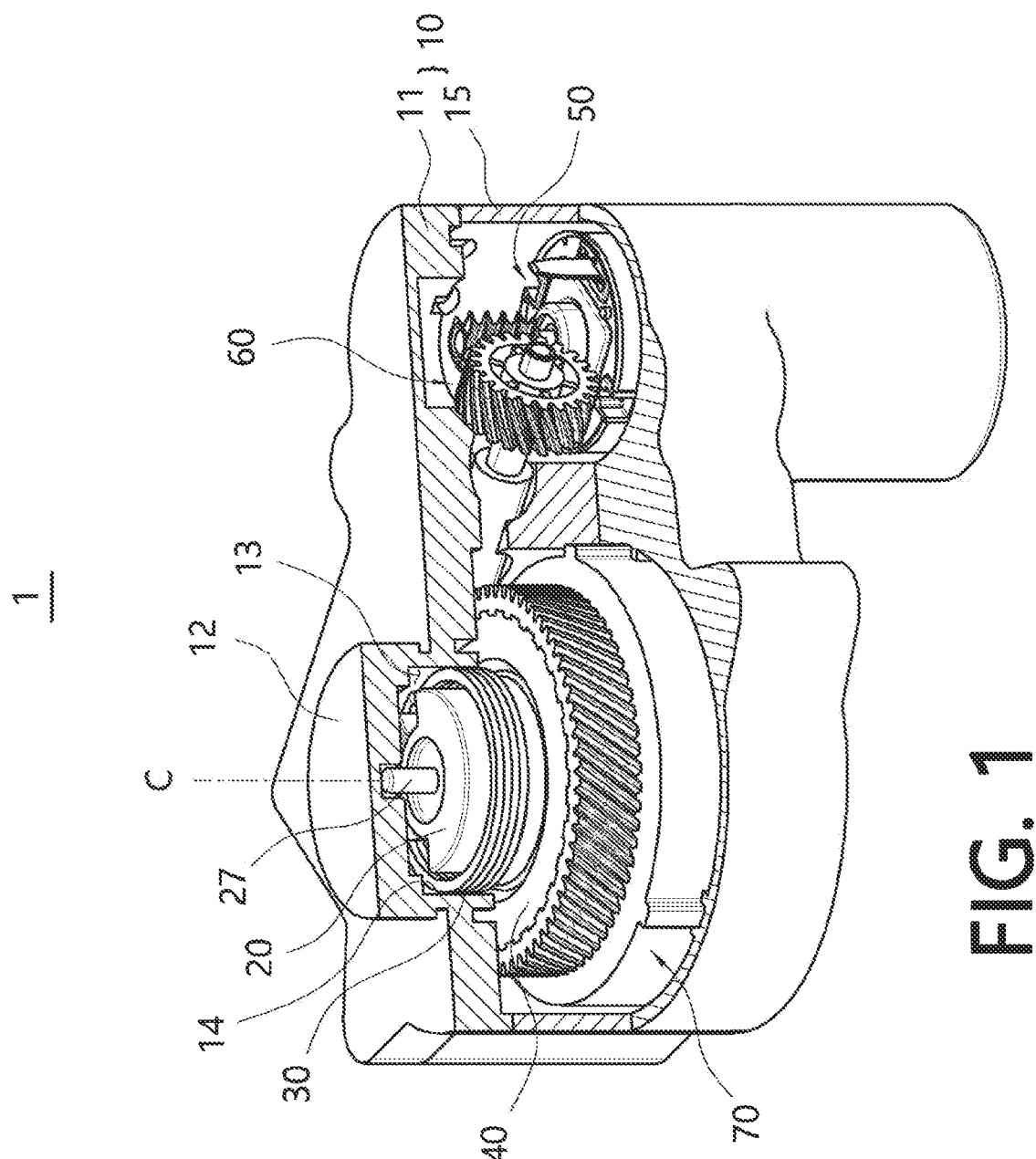
FIG. 1 is a perspective view of a brake locking apparatus according to an embodiment of the present invention. Here, one side of the housing is shown in cross section.

Hereinafter, with reference to the accompanying drawings, embodiments of the present invention will be described in detail so as to be easily implemented by one of ordinary skill in the art to which the present invention pertains. The present invention may be embodied in a variety of forms and is not limited to the embodiments described herein. In order to clearly describe the present invention, parts irrelevant to the description are omitted from the drawings; and throughout the specification, same or similar components are referred to with like reference numerals.

The words and terms used in the specification and claims of the present application are not to be construed as being limited to their ordinary or dictionary meanings, but should be interpreted as having meanings and concepts consistent with the technical spirit of the present invention, based on the principle that the inventor(s) may define terms and concepts to best describe the invention.

In the specification, terms such as "comprise" or "include" or "have" are intended to explain that a feature, number, step, operation, component, part or combination thereof described in the specification is present, but should not be construed to preclude the possibility of the presence or addition of one or more other features, numbers, steps, operations, components, parts or combinations thereof.

When a component is said to be "before", "after", "above" or "below" another component, it includes a case in which the component is placed "before", "after", "above" or "below" another component so as to be in direct contact with each other, as well as a case where any additional component is disposed between the two components, unless there are special circumstances or unless the context clearly indicates otherwise. In addition, when a component is said to be "connected" to another component, it includes cases where they are not only directly connected to each other but also indirectly connected to each other, unless there are special circumstances or unless the context clearly indicates otherwise.

A brake locking apparatus according to embodiments of the present invention is an apparatus capable of maintaining an operating state of a brake by generating a parking force (hereinafter, a locking force) by which a brake pad presses a brake disc.

In this case, the brake locking apparatus according to embodiments of the present invention is configured such that when the force by which the brake disc pushes the brake pad (i.e., a reaction force against the locking force) increases, the locking force increases proportionally, whereby a large locking force can be efficiently generated.

Figure 2:
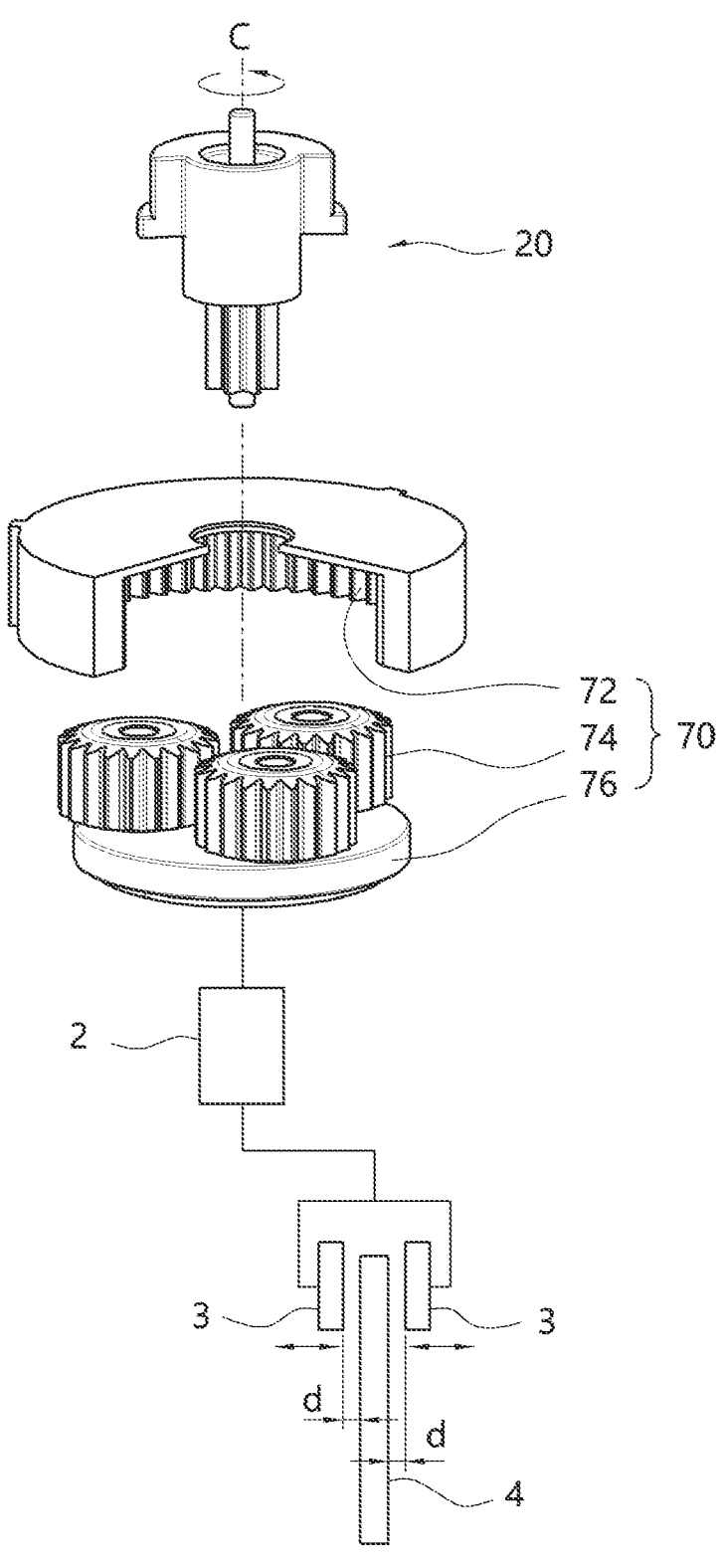
FIG. 2 is a view for explaining a process in which a brake pad provided in a vehicle is moved or position-fixed by a first rotating member of the brake locking apparatus shown in FIG. 1.
Figure 3:
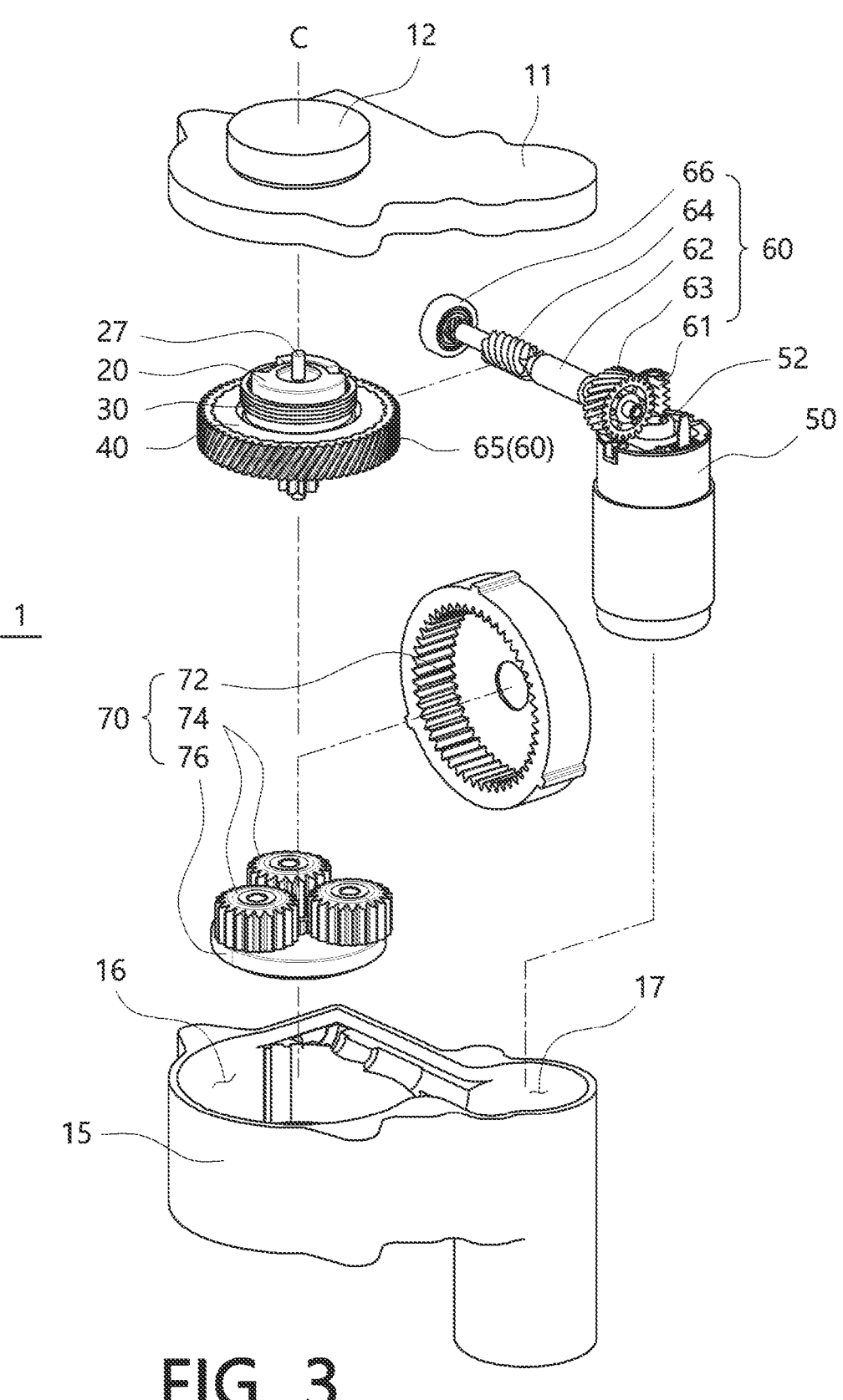
FIGS. 3 and 4 are exploded perspective views of a brake locking apparatus according to an embodiment of the present invention when viewed from different angles.
Figure 4:
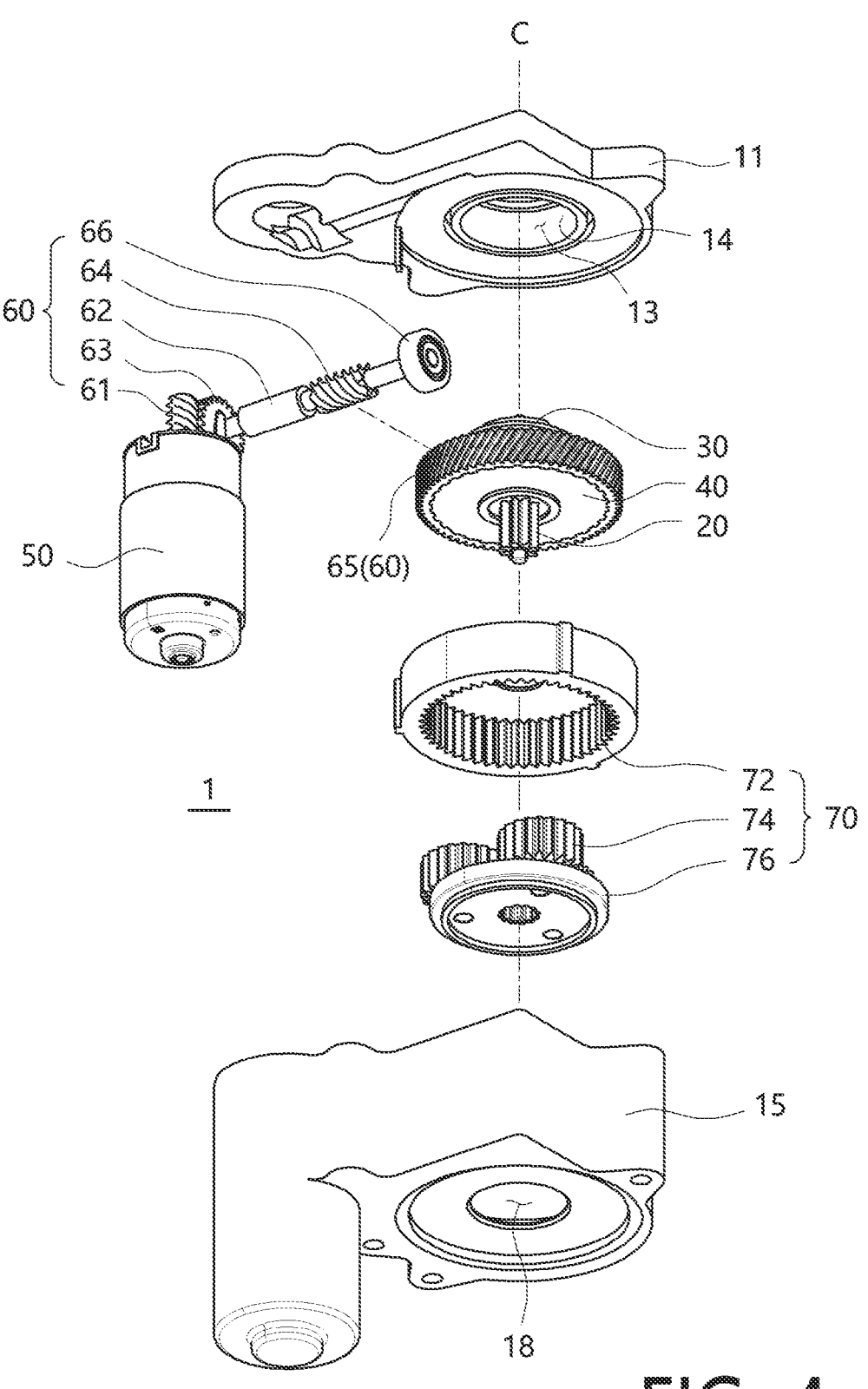
Figure 5:
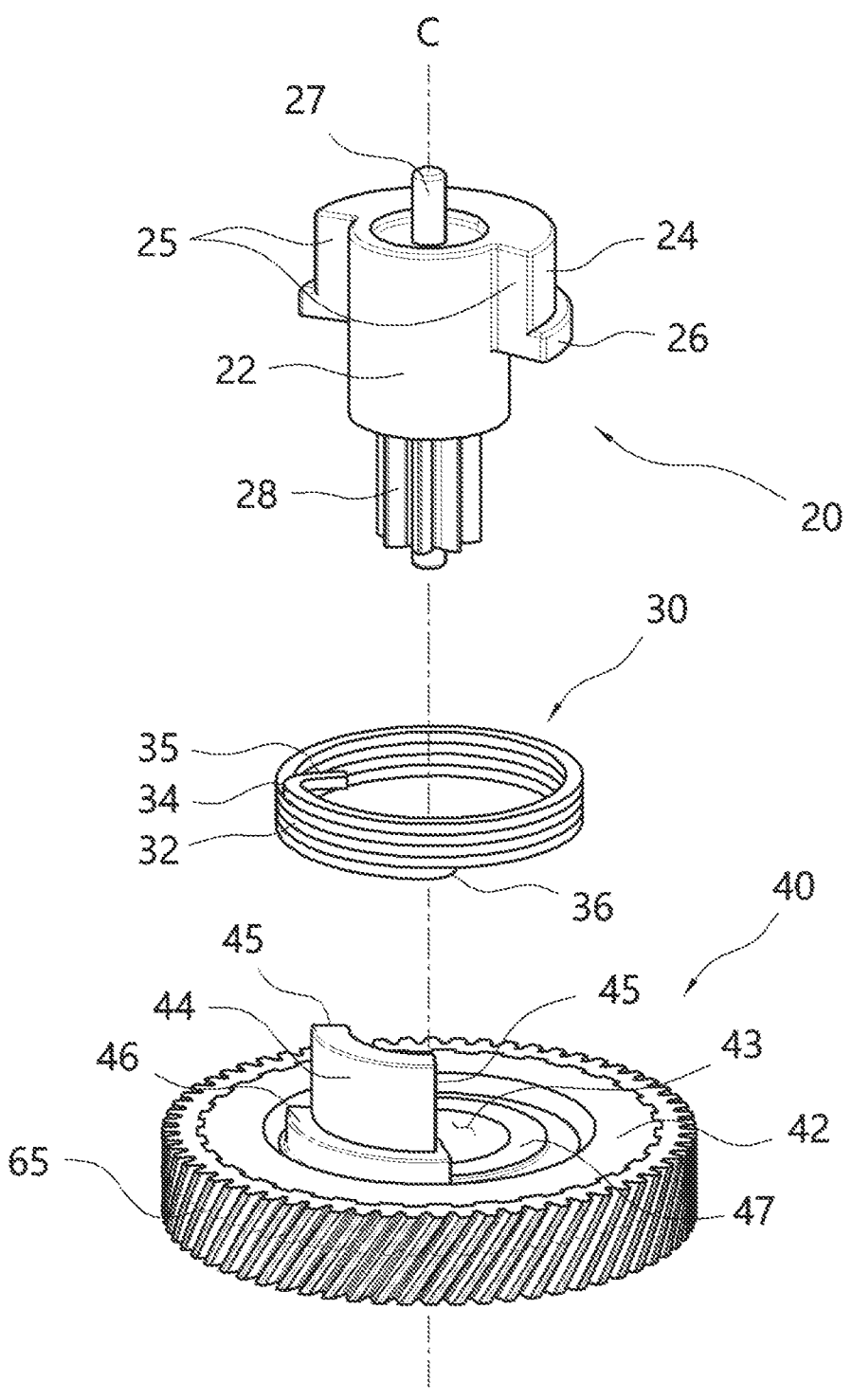
FIGS. 5 and 6 are exploded perspective views of a first rotating member, an elastic member and a second rotating member of the brake locking apparatus shown in FIG. 3 when viewed from different angles.
Figure 6:
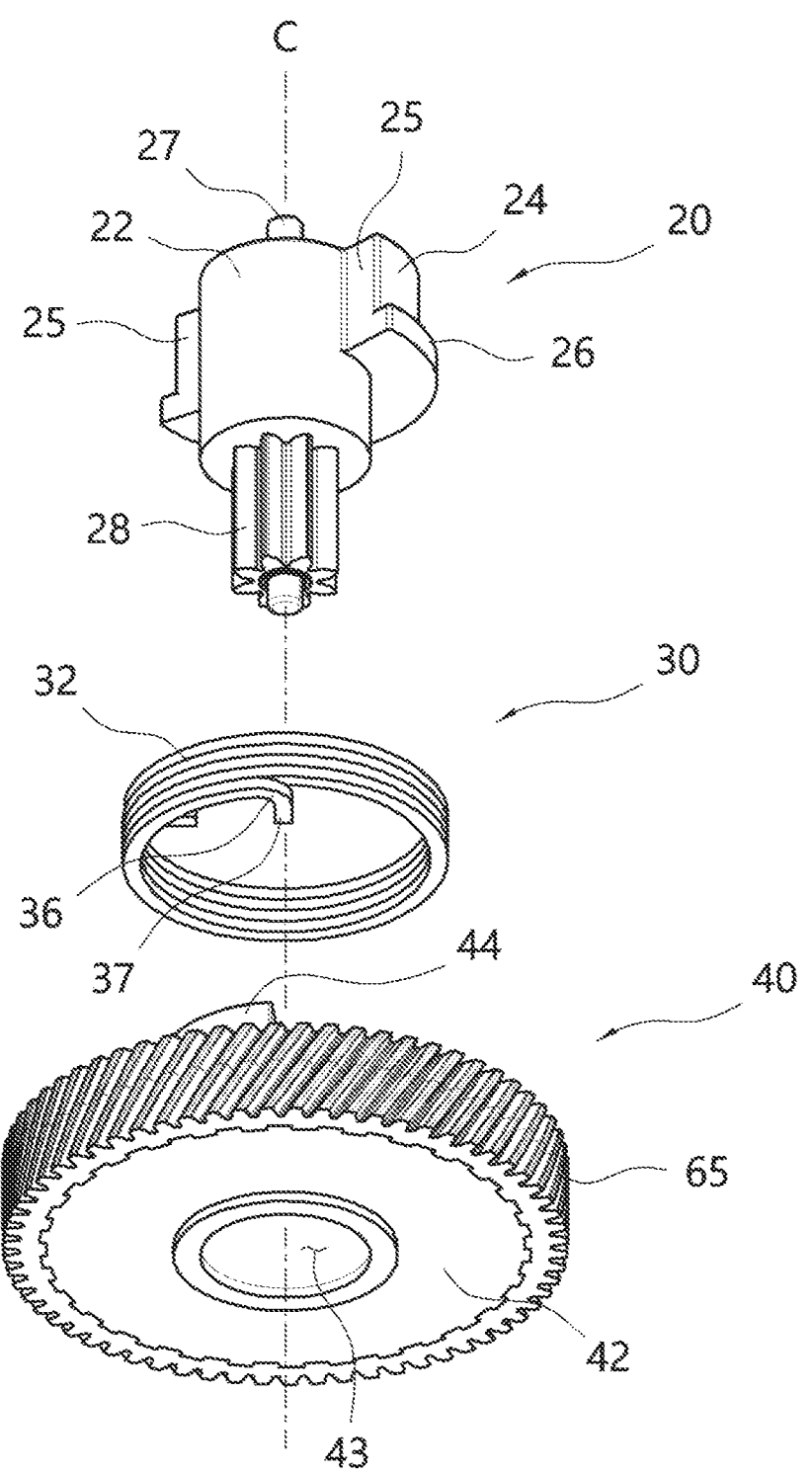
Figure 7:
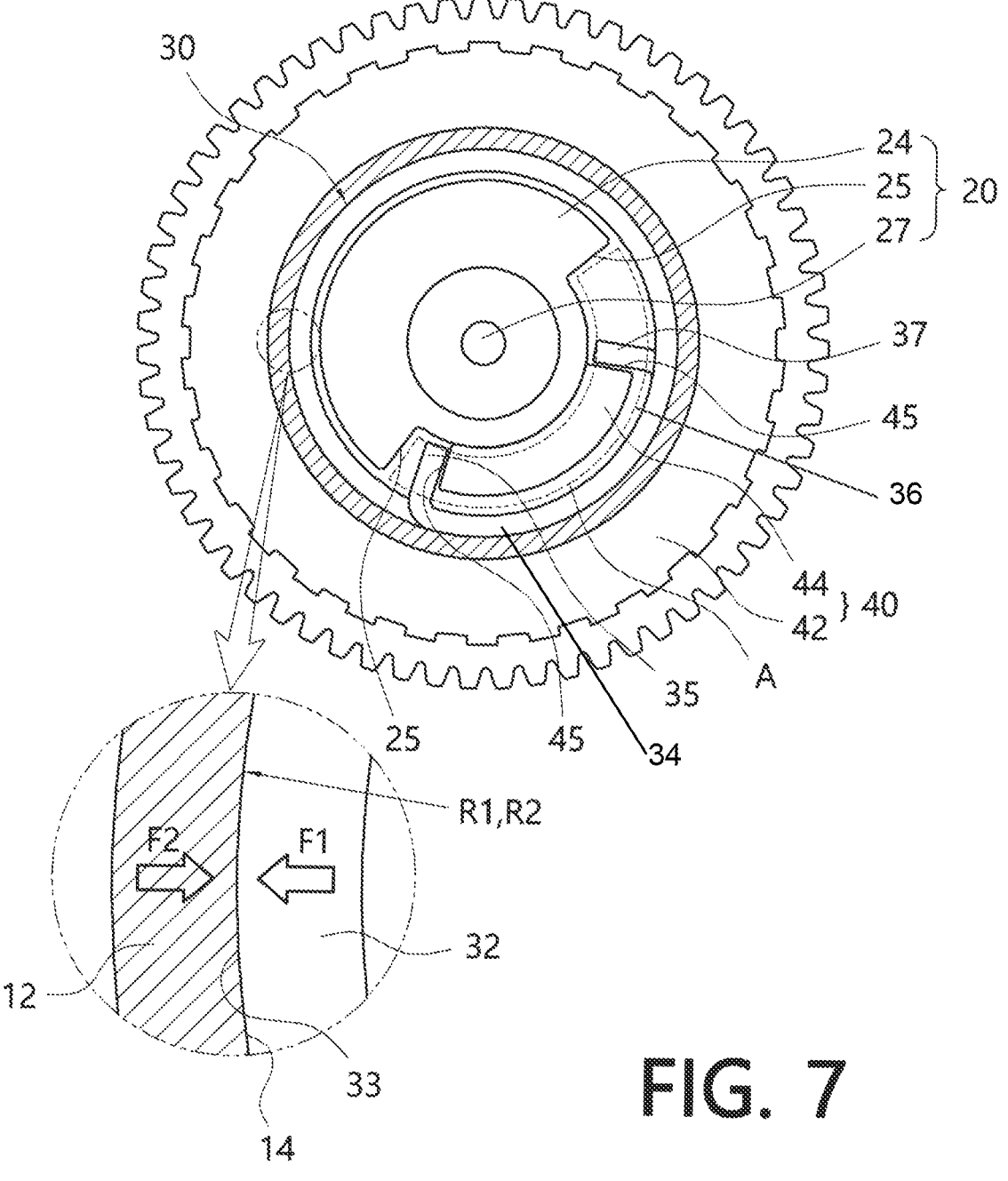
FIG. 7 is a plan view of a first rotating member, an elastic member, a second rotating member and a cover member of the brake locking apparatus shown in FIG. 1. Here, the cover member is shown in cross section.

FIG. 1 is a perspective view of a brake locking apparatus according to an embodiment of the present invention. Here, one side of the housing is shown in cross section. FIG. 2 is a view for explaining a process in which a brake pad provided in a vehicle is moved or position-fixed by a first rotating member of the brake locking apparatus shown in FIG. 1. FIGS. 3 and 4 are exploded perspective views of a brake locking apparatus according to an embodiment of the present invention when viewed from different angles. FIGS. 5 and 6 are exploded perspective views of a first rotating member, an elastic member and a second rotating member of the brake locking apparatus shown in FIG. 3 when viewed from different angles. FIG. 7 is a plan view of a first rotating member, an elastic member, a second rotating member and a cover member of the brake locking apparatus shown in FIG. 1. Here, the cover member is shown in cross section.

Referring to FIG. 1, a brake locking apparatus 1 according to an embodiment of the present invention may include: a housing 10, a first rotating member 20, an elastic member 30, a second rotating member 40, an actuator 50, a power transmission member 60 and a planetary gear part 70.

First, with reference to FIG. 2, a process in which the first rotating member 20 according to an embodiment of the present invention and a brake pad provided on a wheel of a vehicle operate in conjunction with each other will be described.

Referring to FIGS. 1 and 2, the first rotating member 20 rotatably provided inside the housing 10 may be a member that rotates in conjunction with movement of the brake pad 3, and a lower part thereof may be connected to the brake pad 3.

A pair of brake pads 3 may be provided and disposed on both sides of a (e.g., disk-shaped) brake disc 4 fixed to the wheel of the vehicle, respectively. These brake pads 3 may move toward the brake disc 4 or may move away from the brake disc 4.

In this case, in an embodiment of the present invention, in order to convert the rotation of the first rotating member 20 into the movement of the brake pad 3, the aforementioned planetary gear part 70 may be provided on the lower side of the first rotating member 20. The planetary gear part 70 according to an embodiment of the present invention may be a gear assembly capable of transmitting power, which will be described below.

In addition, the planetary gear part 70 and the brake pad 3 may be operatively connected by a separate connection structure 2. The connection structure 2 may be configured to convert the rotation or movement of the first rotating member 20 and the planetary gear part 70 into the movement of the brake pad 3. To this end, the connection structure 2 may include a gear box including, for example, a spur gear, a rack gear, and the like.

In this embodiment, when the first rotating member 20 rotates in a first direction, the rotation of the first rotating member 20 may be converted into a linear motion of the brake pad 3 by the planetary gear part 70 and the connection structure 2, and the brake pad 3 may move away from the brake disc 4. Accordingly, a distance d between the brake pad 3 and the brake disc 4 may increase.

In addition, in this embodiment, when the first rotating member 20 rotates in a second direction opposite to the first direction, the brake pad 3 may move toward the brake disc 4. Accordingly, the distance d between the brake pad 3 and the brake disc 4 may decrease.

According to this embodiment, the operation of the first rotating member 20 and the brake pad 3 may be performed in a reverse direction by the planetary gear part 70 and the connection structure 2.

For example, when the brake pad 3 moves away from the brake disc 4 so that the distance d between the brake pad 3 and the brake disc 4 increases, the first rotating member 20 may rotate in the first direction. That is, the first rotating member 20 and the brake pad 3 may always be moved in conjunction with each other by the planetary gear part 70 and the connection structure 2.

Conversely, when the brake pad 3 moves toward the brake disc 4 so that the distance d between the brake pad 3 and the brake disc 4 decreases, the first rotating member 20 may rotate in the second direction opposite to the first direction.

In this case, according to an embodiment of the present invention, a locking force for limiting the rotation of the first rotating member 20 may be required to in order to maintain a state in which the brake pad 3 presses the brake disc 4 (the brake is activated).

More specifically, when the brake pad 3 presses the brake disc 4, a reaction force by which the brake disc 4 pushes the brake pad 3 may be generated. The reaction force may act to separate the brake pad 3 from the brake disc 4 and may rotate the first rotating member 20.

In this case, the brake locking apparatus 1 according to an embodiment of the present invention may be configured to maintain a state in which the brake pad 3 presses the brake disc 4 (the brake is activated) by generating a locking force corresponding to the reaction force using the elastic member 30 and the housing 10 described below.

Hereinafter, other configurations of the brake locking apparatus according to an embodiment of the present invention will be described in more detail.

Referring to FIGS. 1, 3 and 4, as described above, the brake locking apparatus 1 according to an embodiment of the present invention may include a housing 10.

In this embodiment, the housing 10 may be a structure that accommodates and protects the first rotating member 20, the elastic member 30, the second rotating member 40, the actuator 50, the power transmission member 60 and the planetary gear part 70, and may be installed on one side of a brake provided in a vehicle. According to the present embodiment, the housing 10 may include an upper housing 11 and a lower housing 15 that are detachably coupled, but is not limited thereto. Accordingly, the manufacturing, installation and maintenance of the brake locking apparatus 1 can be made easier.

Referring to FIG. 3, in this embodiment, the lower housing 15 may have a barrel shape with an open upper side or end. The left side of the lower housing 15 may have a first accommodating groove 16 recessed downward coaxial or parallel with a central axis C. In addition, the right side of the lower housing 15 may have a second accommodating groove 17. These first and second accommodating grooves 16 and 17 may be open upward. In this case, a connection hole 18 (see e.g., FIG. 4) communicating with the outside may be formed on the bottom surface of the first accommodating groove 16.

Referring to FIGS. 3 and 4, in this embodiment, the upper housing 11 may be coupled to the upper side of the lower housing 15 to cover the first and second accommodating grooves 16 and 17 that open upward. In addition, the upper surface of the upper housing 11 may be provided with a cover member 12 having a cylindrical shape arranged in a direction coaxial or parallel to the central axis C.

In the present embodiment, an installation groove 13 may be formed inside the cover member 12. The installation groove 13 may be open downward through the lower surface of the upper housing 11. The installation groove 13 may have a circular cross section perpendicular to the central axis C, but is not limited thereto.

In this embodiment, the bottom surface of the installation groove 13 may be provided with a groove (shown in FIG. 1) to which a rotation axis member 27 to be described below may be rotatably coupled. A separate bush (not shown) may be provided inside the groove.

On the other hand, according to an embodiment of the present invention, the first rotating member 20, the elastic member 30, the second rotating member 40 and the planetary gear part 70 may be disposed inside the first accommodating groove 16.

Referring to FIGS. 5 to 7, in this embodiment, the first rotating member 20 may include a first body part 22, a first protrusion 24 and a coupling part 28. In this case, the first body part 22 may be or include a cylindrical member rotatably provided in the first accommodating groove 16, but is not limited thereto.

In addition, in this embodiment, the coupling part 28 may be provided on the lower side of the first body part 22. The outer circumferential surface of the coupling part 28 may be provided with a gear protruding downward from the first body part 22 to be coupled to the planetary gear part 70 to be described below.

In this embodiment, the rotation axis member 27 rotating integrally with the first body part 22 may be coupled to the central portion of the first body part 22 when viewed in the direction of the central axis C. The rotation axis member 27 may extend in a direction coaxial or parallel to the central axis C. The upper end of the rotation axis member 27 may be installed in a groove (shown in FIG. 1) formed on the bottom surface of the installation groove 13 or in the cover member 12 (shown in FIG. 1). Accordingly, the rotation axis member 27 can be supported by the housing 10, and the first rotating member 20 can stably rotate together with the rotation axis member 27.

Referring to FIGS. 5 to 7, in this embodiment, the first protrusion 24 and an operating space A may be provided on the circumferential side of the first body part 22.

In this embodiment, the first protrusion 24 may protrude from the first body part 22 in the radial direction of the first body part 22. The first protrusion 24 may be formed along the circumference of the first body part 22 in the circumferential direction of the central axis C by a certain section. In the remaining section, the operating space A may be provided along the circumference of the first body part 22 in the circumferential direction of the central axis C.

In this embodiment, a support surface 25 may be formed in a direction parallel to the central axis (C) on both sides of the first protrusion 24 in the circumferential direction. The support surface 25 may extend radially outwardly away from the first body part 22. This support surface 25 may be configured to be in contact with bent parts 35 and 37 of the elastic member 30 to be described below. The first end 34 and the second end 36 may elastically support the support surface 25.

In this embodiment, the support surface 25 may define a plane parallel to the central axis C. However, if it can be stably supported by the bent parts 35 and 37, the angle of inclination or degree of curvature of the support surface 25 with respect to the central axis C is not particularly limited.

Meanwhile, according to the present embodiment, the first protrusion 24 may have an arc shape formed in a circumferential direction along the circumference of the first body part 22. Accordingly, the first protrusion 24 may have sufficient rigidity. That is, even if a large force is applied to the support surface 25 in the circumferential direction as the bent parts 35 and 37 press the support surface 25, the first protrusion 24 can resist the force without being deformed.

However, as long as the first protrusion 24 is formed of a material having sufficient rigidity and thus can sufficiently resist an external force, the first protrusion 24 may have a different shape. For example, the first protrusion 24 may be formed of a plurality of ribs protruding in the radial direction and having a predetermined thickness.

Hereinafter, based on FIG. 5, the support surface located on the left side is referred to as a first support surface 25, and the support surface located on the right side is referred to as a second support surface 25.

Referring to FIG. 5, in the present embodiment, a lower portion of the first protrusion 24 may be provided with a first hooking part 26 protruding in a radial direction of the central axis C. The first hooking part 26 may be disposed adjacent the elastic member 30. In this case, the first hooking part 26 may have a larger diameter than the outer diameter of the spring part 32 to be described below. Accordingly, the upper surface of the first hooking part 26 can support the lower side of the elastic member 30 to be described below.

Referring back to FIGS. 5 to 7, in this embodiment, the elastic member 30 may be disposed outside the first rotating member 20. The elastic member 30 may include a (e.g., cylindrical) spring part 32 located on the circumference of the first body part 22. This spring part 32 may be configured such that the outer diameter is expanded or reduced when the upper end or the lower end is pressed in the circumferential direction of the central axis C.

Meanwhile, in the present embodiment, the spring part 32 may be formed of a spiral coil spring, but the spring part 32 may be formed of an elastic body having a different shape as long as the outer diameter can increase or decrease as the spring part 32 is pressed in the circumferential direction. For example, in another embodiment, the spring part 32 may be provided in a ring shape.

Meanwhile, according to an embodiment of the present invention, both ends of the spring part 32 may be provided with bent parts 35 and 37 bent inwardly. The bent parts 35 and 37 may be formed to be bent inward so as to come into contact with the support surface 25 of the first rotating member 20. In this case, in order for the bent parts 35 and 37 to stably support the first rotating member 20 while sufficiently securing an area where the support surface 25 and the bent parts 35 and 37 are in contact with each other, the bent parts 35 and 37 may be formed in a direction perpendicular to the inner circumferential surface of the spring part 32.

Based on FIGS. 5 and 6, the bent part located on the left side is referred to as a first bent part 35, and the bent part located on the right side is referred to as a second bent part 37.

Referring to FIG. 7, in this embodiment, a first end or first end portion 34 of the spring part 32 at which the first bent part 35 is formed may extend in the circumferential direction along the outer circumferential surface or outer circumferential portion of the operating space A. Similarly, a second end or second end portion 36 of the spring part 32 where the second bent part 37 is formed may extend in a direction opposite to the direction in which the first end 34 extends along the outer circumferential surface or outer circumferential portion of the operating space A. The operating space A may be defined by the circumference of the first body part 22 between the first support surface 25 and the second support surface 25. In addition, the first and second bent parts 35 and 37 may be located inside the operating space A.

Accordingly, when the first rotating member 20 rotates in one direction (or the opposite direction) around the rotation axis member 27, the first support surface 25 (or the second support surface 25) and the first bent part 35 (or the second bent part 37) may come into contact with each other. In addition, when the first bent part 35 (or the second bent part 37) is pressed in the circumferential direction, the outer diameter of the spring part 32 may be expanded. An arc length defined between the first support surface 25 and the second support surface 25 may be greater than an arc length defined between the first bent part 35 and the second bent part 37. Effects generated by the above-described operation will be described below together with FIGS. 11 and 12.

Meanwhile, referring to FIG. 1, in this embodiment, the elastic member 30 may be located inside the installation groove 13 of the upper housing 11. In this case, the elastic member 30 may be press-fitted and installed inside the installation groove 13.

More specifically, according to the present embodiment, the installation groove 13 may be formed to have an inner diameter smaller than an outer diameter of the spring part 32. In addition, the spring part 32 may be press-fitted and installed in the installation groove 13 in a state in which the outer diameter is retracted to be reduced by elasticity.

Hereinafter, the difference between the outer diameter of the spring part 32 and the inner diameter of the installation groove 13 described above may be referred to as a gap.

As described above, when the spring part 32 is press-fitted and installed in the installation groove 13, the outer circumferential surface of the spring part 32 may press outwardly against the inner surface 14 of the upper housing 11 such as the inner surface 14 of the installation groove 13 and the inner surface 14 of the cover member 12. Accordingly, a normal force may act between the outer circumferential surface of the spring part 32 and the inner surface 14 of the installation groove 13. The normal force may generate a frictional force between the elastic member 30 and the inner surface 14 of the upper housing 11. A friction member may be provided on the inner surface 14 of the housing 10 (e.g., upper housing 11, cover member 12, or installation groove 13) to increase a frictional force between the outer circumferential surface of the elastic member 30 (e.g., spring part 32) and the inner surface of the housing 10 (e.g., upper housing 11, cover member 12, or installation groove 13).

In this embodiment, the frictional force may act as a locking force required for the bent parts 35 and 37 to support the support surface 25 of the first rotating member and limit rotation. In this case, in order to increase the frictional force, the gap may be increased, or a frictional member (not shown) having a large frictional coefficient may be provided on the inner surface 14 of the installation groove 13.

Meanwhile, referring to FIGS. 5 and 6, in this embodiment, at one side of the elastic member 30 there may be provided the second rotating member 40 capable of rotating the first rotating member 20. In this embodiment, the second rotating member may include a (e.g., disk-shaped) second body part 42 having a predetermined thickness.

According to this embodiment, a through hole 43 may be formed at the center of the second body part 42 when viewed in the direction of the central axis C. The through hole 43 may be formed in the direction of the central axis C. In addition, the first body part 22 may be disposed in the through hole 43 so as to be relatively rotatable. That is, the first protrusion 24 may be disposed above the second body part 42, and the coupling part 28 may be disposed below the second body part 42. Accordingly, the first rotating member 20 and the second rotating member 40 may be compactly disposed inside the housing 10 (shown in FIG. 1).

In this embodiment, the through hole 43 may be formed to have a diameter larger than that of the first body part 22 and smaller than that of the first hooking part 26. Further, the upper surface of the second body part 42 may be provided with a second protrusion 44 and an installation surface 47.

In this embodiment, the second protrusion 44 may be formed to protrude upward from the second body part 42. The second protrusion 44 may be formed to extend in the direction of the central axis C so as to come into contact with the first bent part 35 located further away from the second bent part 37 in the direction of the central axis C.

In this case, in the present embodiment, the second protrusion 44 may be formed along the circumference of the through hole 43 at one section in the circumferential direction of the central axis C. In addition, the installation surface 47 may be formed along the circumference of the through hole 43 at the remaining section (the section without the second protrusion 44) in the circumferential direction of the central axis C. The second protrusion 44 may have an arch shape.

According to this embodiment, the section in which the second protrusion 44 is formed may correspond to the above-described operating space A. In this case, the circumferential length or arc length of the section in which second protrusion 44 is formed may be shorter than the circumferential length or arc length of the operating space A.

In addition, according to this embodiment, the section in which the installation surface 47 is formed may correspond to the section in which the above-described first protrusion 24 is formed. In this case, the circumferential length or arc length of the section in which the installation surface 47 is formed may be longer than the circumferential length or arc length of the section in which the first protrusion 24 is formed.

Accordingly, the first hooking part 26 of the first rotating member 20 may be supported by being seated on the installation surface 47 of the second rotating member 40, and the second protrusion 44 of the second rotating member 40 may be disposed inside the operating space A provided around the first rotating member 20.

Meanwhile, referring again to FIGS. 5 to 7, in this embodiment, the second protrusion 44 may have an arc shape formed in a circumferential direction along the circumference of the through hole 43, and both sides or ends of the second protrusion 44 may be provided with a pressing surface 45 formed in a direction parallel to the central axis C.

Hereinafter, based on FIG. 5, the pressing surface located on the left side is referred to as a first pressing surface 45, and the pressing surface located on the right side is referred to as a second pressing surface 45.

Referring to FIG. 7, in this embodiment, as described above, the second protrusion 44 may be located inside the operating space A. More specifically, the second protrusion 44 may be located inside the operating space A, so that the first end 34 of the spring part 32 at which the first bent part 35 is formed may extend in the circumferential direction along the outer surface of the second protrusion 44. In addition, similarly to the first bent part 35, the second end 36 of the spring part 32 at which the second bent part 37 is formed may extend along the outer surface of the second protrusion 44 in a direction opposite to the direction in which the first end 34 extends.

Accordingly, when the second rotating member 40 rotates in one direction (or the opposite direction) around the rotation axis member 27, the first pressing surface (or the second pressing surface 45) may come into contact with the first bent part (or the second bent part 37). Then, when the first pressing surface 45 (or the second pressing surface 45) presses the first bent part 35 (or the second bent part 37) in the circumferential direction, the spring part 32 may be retracted to reduce the outer diameter thereof. Effects generated by the above-described operation will be described below together with FIGS. 8 to 10.

Meanwhile, referring back to FIGS. 5 and 6, in this embodiment, a second hooking part 46 may be formed at a lower portion of the second protrusion 44 adjacent the second body part 42. Referring to FIG. 5, in the present embodiment, the second hooking part 46 protruding in a radial direction of the central axis C. In this case, the second hooking part 46 may have a larger outer diameter than that of the spring part 32. Thereby, the lower side of the spring part 32 may be supported by the upper surface of the second hooking part 46.

In this case, when the elastic member 30 is supported by the first and second hooking parts 26 and 46, the heights of the first hooking part 26 and the second hooking part 46 in the direction of the central axis C may be adjusted so that the elastic member does not incline in a direction perpendicular to the central axis C. More specifically, in the present embodiment, the first hooking part 26 and the second hooking part 46 may be formed to have the same height in the direction of the central axis C in a state in which the first hooking part 26 is supported in contact with the installation surface 47.

Referring back to FIGS. 3 and 4, in this embodiment, the second accommodating groove 17 of the lower housing 15 may accommodate the actuator 50 for providing a driving force for rotating the second rotating member 40. For example, the actuator 50 may be formed of an electric motor.

In this embodiment, one side or end of the actuator 50 may be provided with a driving shaft 52 that rotates by the driving force generated by the actuator 50, and a power transmission member 60 may be provided between the driving shaft 52 and the second rotating member 40.

In this embodiment, the power transmission member 60 may be composed of a gear assembly that transmits the driving force generated by the actuator 50 to the second rotating member 40. More specifically, the power transmission member 60 may include a driven shaft 62 arranged to be perpendicular to the driving shaft 52 and in contact with the outer circumferential surface of the second body part 42 of the second rotating member 40.

According to this embodiment, a first worm wheel 63 may be provided at one end of the driven shaft 62, and a first worm (first worm gear) 61 engaged with the first worm wheel 63 may be formed or provided at an end of the driving shaft 52. A second worm (second worm gear) 64 may be formed or provided in the middle of the driven shaft 62, and a second worm wheel 65 engaged with the second worm 64 may be provided on the outer circumferential surface of the second body part 42 of the second rotating member 40. In this case, in this embodiment, the second rotating member 40 may be rotated by the driving force generated by the actuator 50 and transmitted by the power transmission member 60.

In this case, the worm wheel-worm structure of the power transmission member 60 may decelerate the rotation generated by the actuator 50. In addition, the worm wheel-worm structure may prevent the first rotating member 20 from rotating the second rotating member 40, thereby increasing the locking force and preventing damage to the actuator 50.

Meanwhile, in this embodiment, the other end of the driven shaft 62 may be provided with a bearing member 66. The bearing member 66 may be formed of a ball bearing, but is not limited thereto. Further, the bearing member 66 may be coupled to the housing 10. Accordingly, the other end of the driven shaft 62 may be supported by the housing 10. Therefore, the driven shaft 62 can rotate while stably transmitting the driving force.

Referring to FIGS. 3 and 4, in this embodiment, the planetary gear part 70 may be located at a lower portion of the first accommodating groove 16. Accordingly, the planetary gear part 70 may be positioned below the second rotating member 40.

In this case, as described in FIG. 2, the planetary gear part 70 may be a gear structure provided between the first rotating member 20 and the brake pad 3 to allow both components to interlock with each other, wherein one side thereof may be coupled to the first rotating member 20, and the other side may be connected to the brake pad 3.

Referring to FIGS. 3 and 4, in this embodiment, the planetary gear part 70 may include a ring gear 72, a plurality of planetary gears 74, and a carrier 76. Here, the ring gear 72 may be formed to have a ring-shaped cross section and may be arranged to be fixed to the inner surface of the first accommodating groove 16. The inner circumferential surface of the ring gear 72 may be formed to have the shape of a helical gear or a spur gear, but is not limited thereto.

According to the present embodiment, the coupling part 28 of the first rotating member 20 protruding outward through the second rotating member 40 may be disposed at the center of the ring gear 72. A gear formed on the outer circumferential surface of the coupling part 28 may perform a function of a sun gear.

In this embodiment, the plurality of planetary gears 74 may be provided between the coupling part 28 of the first rotating member 20 and the ring gear 72. In this case, the plurality of planetary gears 74 may be in external contact with the sun gear of the outer circumferential surface of the coupling part 28 and may be in internal contact with the ring gear 72. In addition, the plurality of planetary gears 74 may be rotatably coupled to the (e.g., disk-shaped) carrier 76. To this end, a predetermined pin may be coupled to the center of the plurality of planetary gears 74.

According to an embodiment of the present invention, a connection shaft (not shown) extending outwardly through the connection hole 18 of the lower housing 15 may be coupled to the center of the carrier 76. The connection shaft may be provided to be connected to the above-described brake pad 3 and rotate in conjunction therewith.

Accordingly, when the coupling part 28 of the first rotating member 20 rotates, the plurality of planetary gears 74 may rotate on their axis and revolve around the coupling part 28. In this case, by means of the plurality of planetary gears 74, the carrier 76 and the connection shaft coupled to the carrier 76 may rotate at the revolution speed of the plurality of planetary gears 74. Accordingly, the planetary gear part 70 may decelerate or accelerate the rotation speed and amplify the transmitted torque.

Hereinafter, there will be described a process in which the brake locking apparatus according to an embodiment of the present invention moves the brake pad toward the brake disc, whereby the brake is activated.

Figure 8:
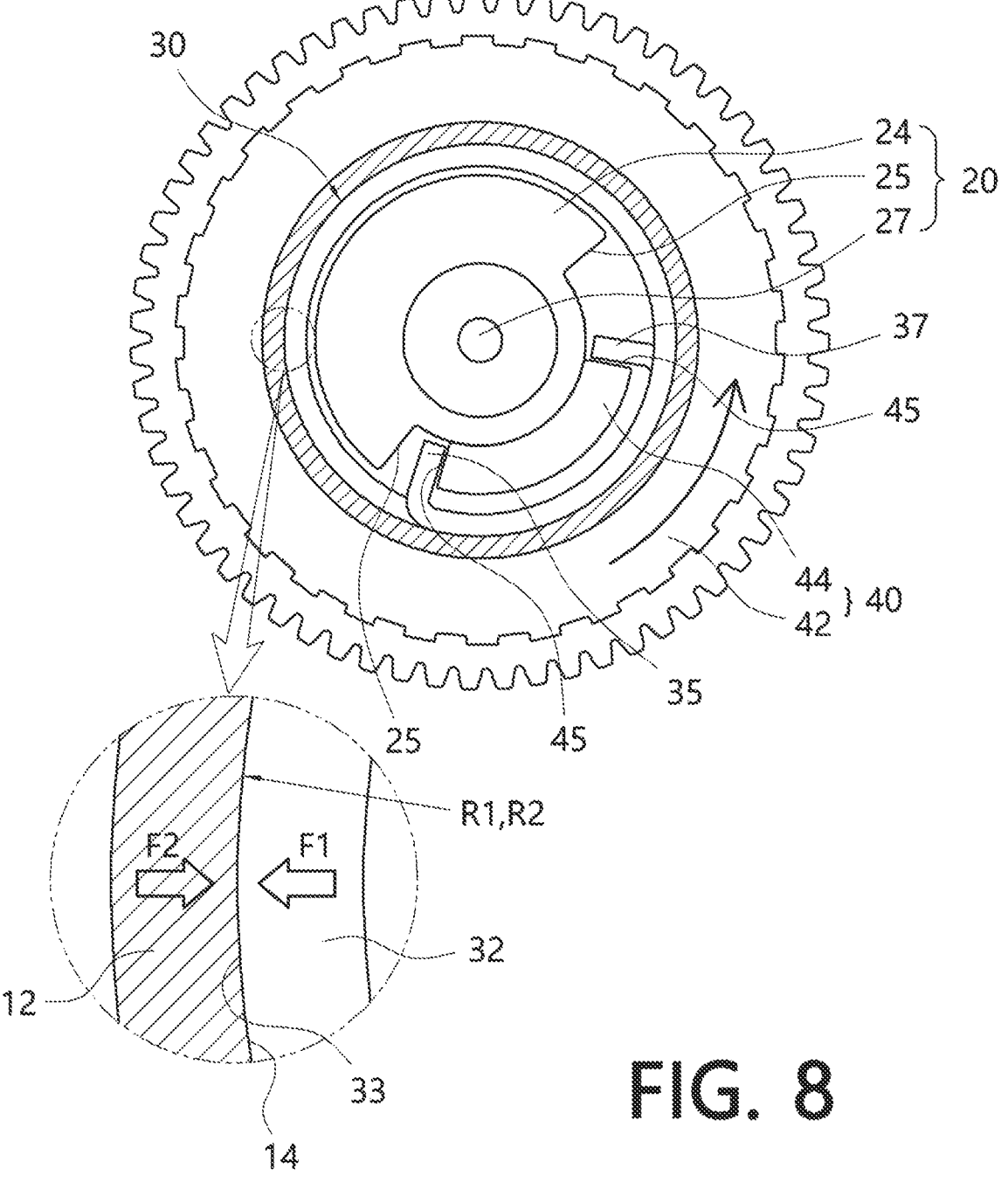
FIGS. 8 to 10 are views for explaining a process in which a brake pad is moved toward a brake disc by a brake locking apparatus according to an embodiment of the present invention.
Figure 9:
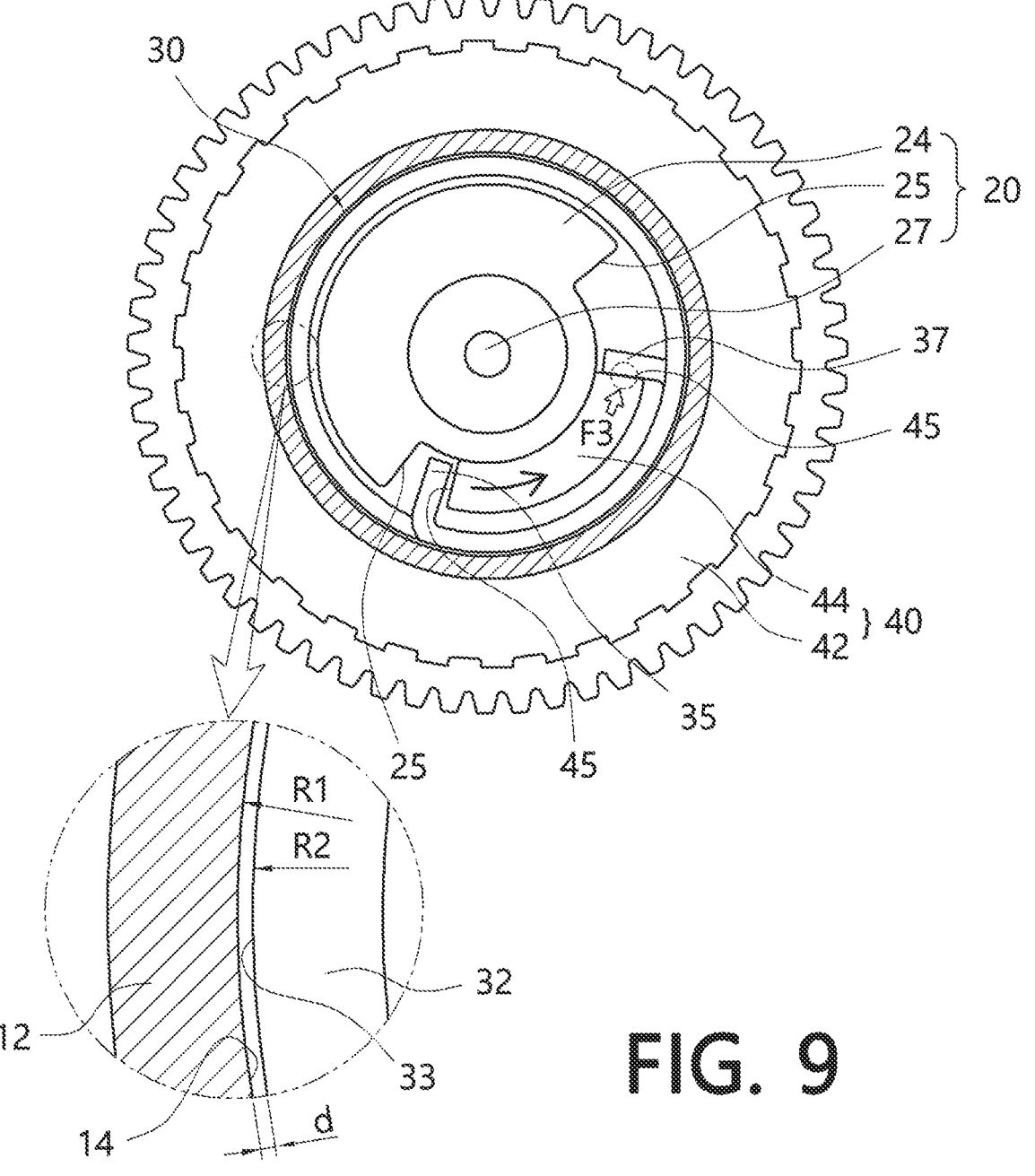
Figure 10:
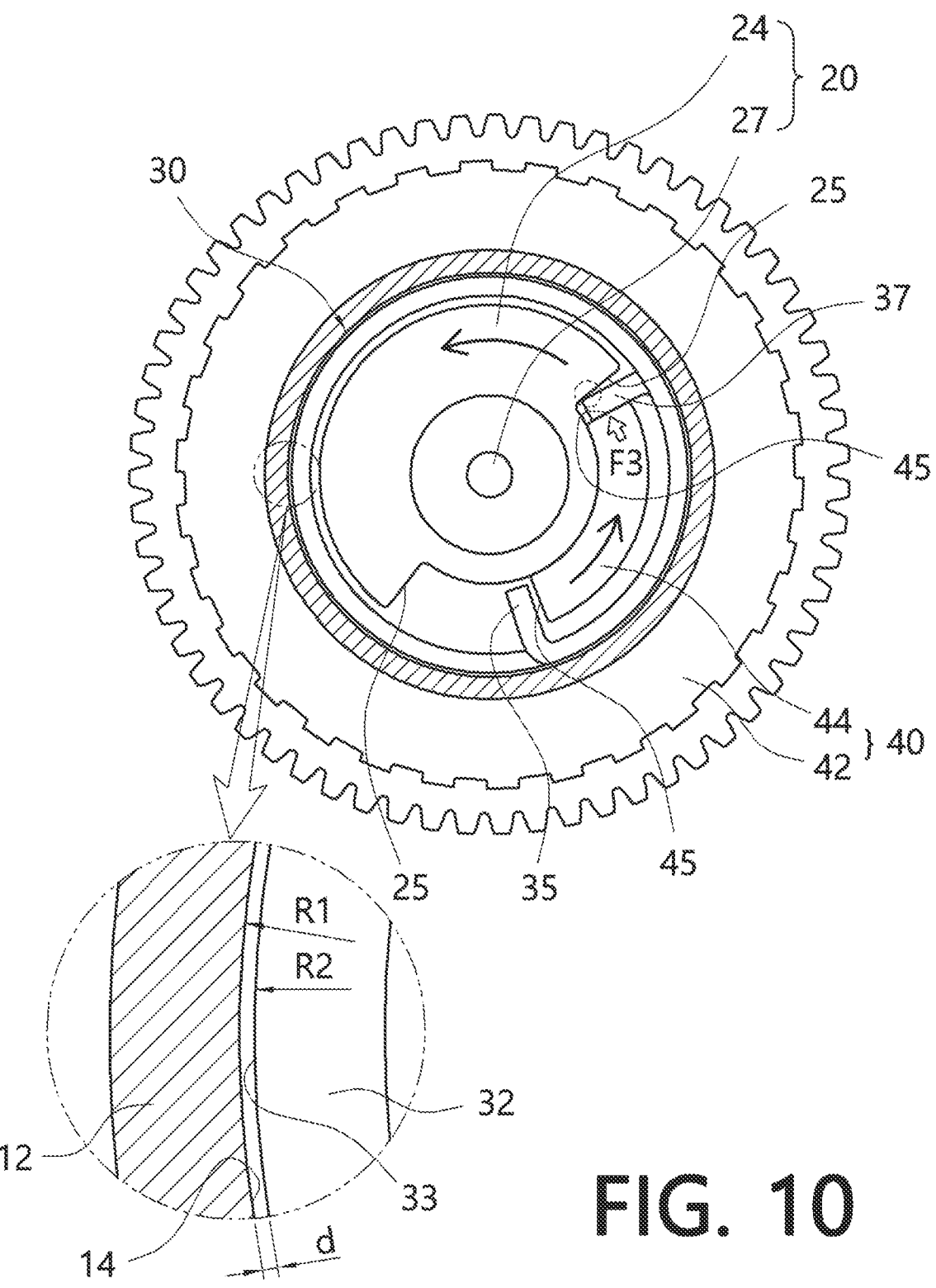

FIGS. 8 to 10 are views for explaining a process in which a brake pad is moved toward a brake disc by a brake locking apparatus according to an embodiment of the present invention.

Referring to FIG. 8, when the second rotating member 40 is rotated in one direction (counterclockwise direction based on FIG. 8) by the actuator 50, the second protrusion 44 rotates toward the second bent part 37 of the elastic member 30. In this case, since the elastic member 30 may be press-fitted and installed in or against the inner surface 14 of the cover member 12, forces F1 and F2 pressing each other may act between the elastic member 30 and the cover member 12.

Referring to FIG. 9, when the second pressing surface 45 and the second bent part 37 come into contact with each other, a force F3 by which the second protrusion 44 presses the second bent part 37 acts. In this case, as described above, when the second protrusion 44 presses the second bent part 37, the outer diameter R2 of the spring part 32 may be reduced to be smaller than the inner diameter R1 of the cover member 12, and the outer circumferential surface 33 of the spring part 32 may be spaced apart from the inner surface 14 of the cover member 12 by a distance d.

As a result, normal force may no longer be generated between the outer circumferential surface 33 of the spring part 32 and the inner surface 14 of the cover member 12, and frictional force may not act on the outer circumferential surface 33 of the spring part 32. Accordingly, the elastic member 30 may rotate counterclockwise together with the second rotating member 40.

Referring to FIGS. 2 and 10 together, when the other side of the second bent part 37 comes into contact with the second support surface 25 of the first rotating member 20, a force F3 by which the second protrusion 44 presses the second bent part 37 acts on the second support surface 25. Accordingly, the first rotating member 20 may be rotated counterclockwise. The rotation of the first rotating member 20 may be converted into a linear motion of the brake pad 3, and the brake pad 3 can move toward the brake disc 4.

As such, in the brake locking apparatus 1 according to an embodiment of the present invention, the actuator 50 may rotate the first rotating member 20, whereby the brake pad 3 can be moved toward the brake disc 4. Accordingly, the brake can be activated.

Hereinafter, there will be described a process in which the brake locking apparatus according to an embodiment of the present invention locks the position of the brake pad, whereby the brake is maintained in an activated state.

Figure 11:
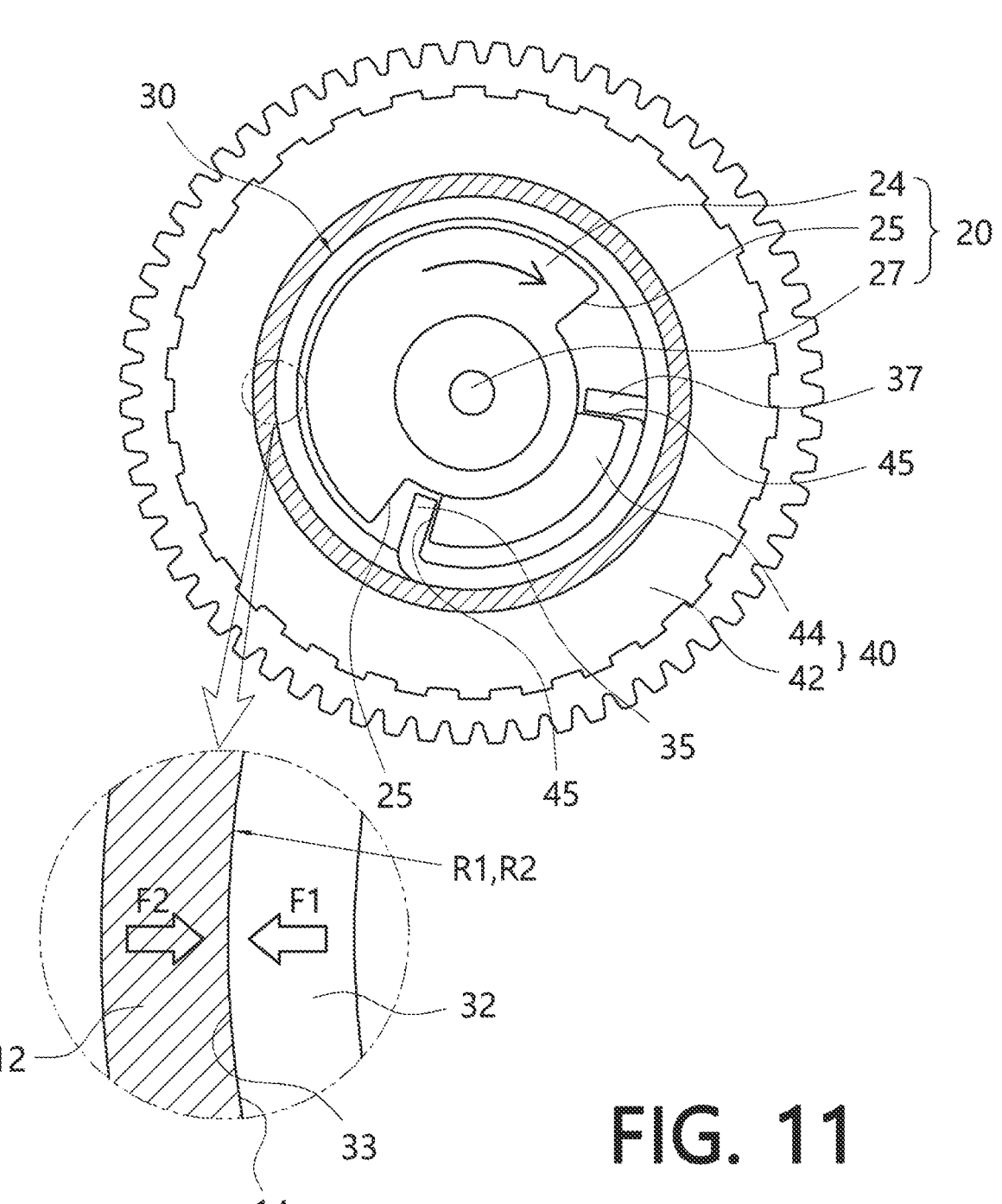
FIGS. 11 and 12 are views for explaining a process in which a position of a brake pad is locked by a brake locking apparatus according to an embodiment of the present invention.
Figure 12:
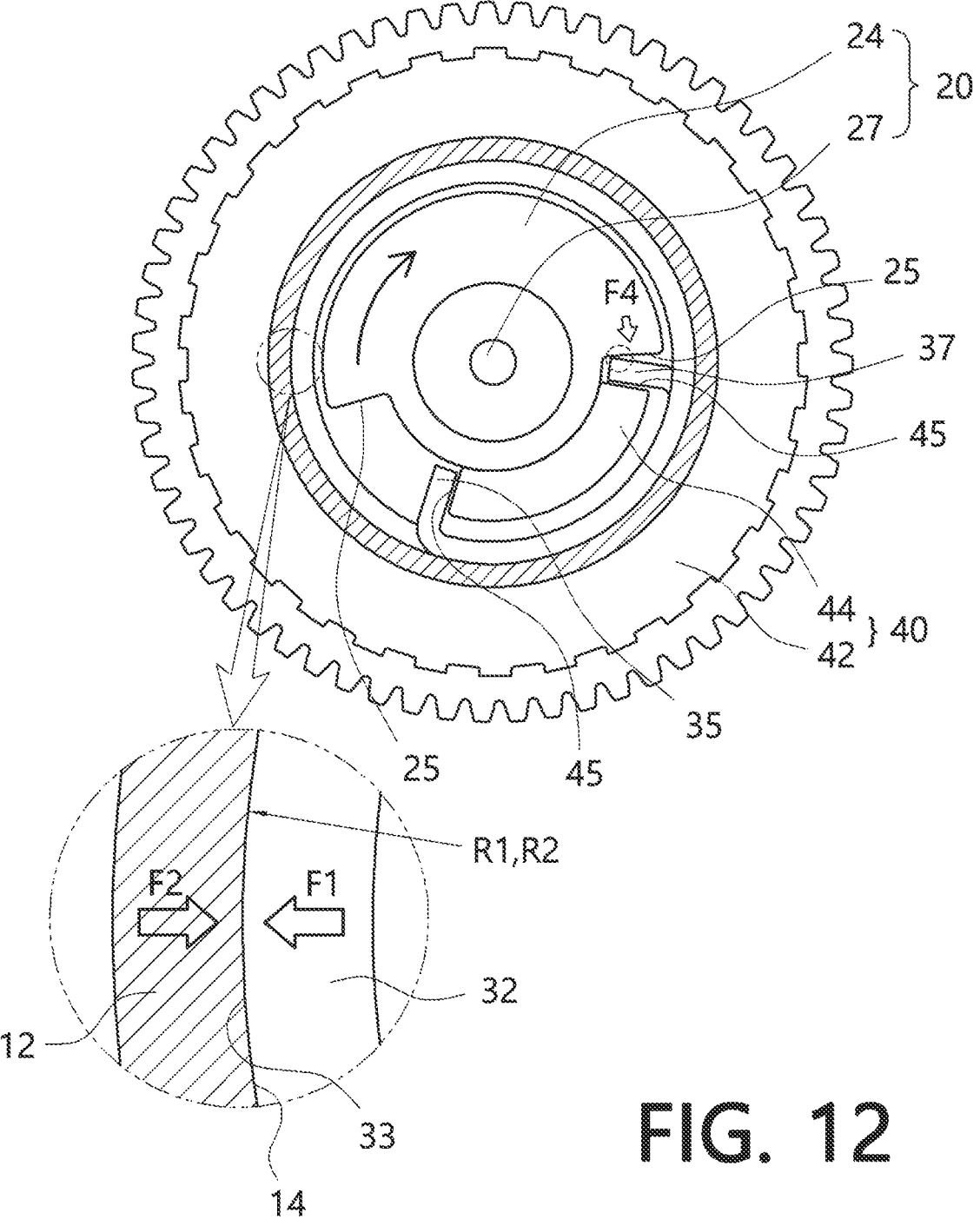

FIGS. 11 and 12 are views for explaining a process in which a position of a brake pad is locked by a brake locking apparatus according to an embodiment of the present invention.

Referring to FIGS. 2 and 11 together, as described above, when the brake pad 3 presses the brake disc 4, a reaction force by which the brake disc 4 pushes the brake pad 3 is generated as a reaction thereto.

The reaction force may rotate the first rotating member 20 in a direction opposite to the one direction (clockwise direction based on FIG. 11). As the first rotating member 20 rotates clockwise, the second support surface 25 rotates in a direction toward the second bent part 37.

Referring to FIGS. 2 and 12 together, as the first rotating member 20 rotates clockwise, the second support surface 25 and the second bent part 37 may come into contact with each other, and a force F4 by which the first protrusion 24 presses the second bent part 37 in a clockwise direction may act.

When the first protrusion 24 presses the second bent part 37, the spring part 32 may tend to be deformed to increase the outer diameter, but the deformation of the spring part 32 may be limited by the inner surface 14 of the cover member 12.

As much as the deformation of the spring part 32 is limited, forces F1 and F2 by which the outer circumferential surface 33 of the spring part 32 and the inner surface 14 of the cover member 12 press each other may be increased. Accordingly, the frictional force generated between the elastic member 30 and the cover member 12 may also be increased. This is because the forces F1 and F2 may act as normal forces that generate the frictional force.

The frictional force may act as a locking force for the second bent part 37 to support the second support surface 25. Accordingly, a counterclockwise locking torque may be applied to the first rotating member 20, the rotation of the first rotating member may be restricted, and the position of the brake pad 3 is locked.

In this case, when the reaction force and the force F4 increase, the forces F1 and F2 may increase correspondingly to increase the frictional force, the locking force and the locking torque, whereby the first rotating member 20 and the brake pad 3 can be locked with a stronger force.

As described above, in the brake locking apparatus 1 according to an embodiment of the present invention, the frictional force between the elastic member and the cover member 12 may increase in proportion to the reaction force of the brake pad 3, thereby efficiently generating a large locking force.

In addition, according to the present embodiment, since the bent parts 35 and 37 are formed to be bent toward the inside of the spring part 32, the bent parts 35 and 37 can be sufficiently spaced apart from the rotation axis member 27 in the radial direction of the central axis C.

By the fact that the radial distance between the bent parts 35 and 37 and the rotation axis member 27 is long, it is meant that even if the force acting between the bent parts 35 and 37 and the first rotating member 20 is small, a larger torque can be applied to the rotation axis member 27.

Accordingly, the brake locking apparatus 1 according to an embodiment of the present invention can minimize the force applied to the bent parts 35 and 37 and the first rotating member 20, thereby minimizing the load applied to the brake locking apparatus 1 in order to generate the locking force.

Hereinafter, there will be described a process in which the brake locking apparatus according to an embodiment of the present invention separates the brake pad from the brake disc, whereby the activated state of the brake is released.

Figure 13:
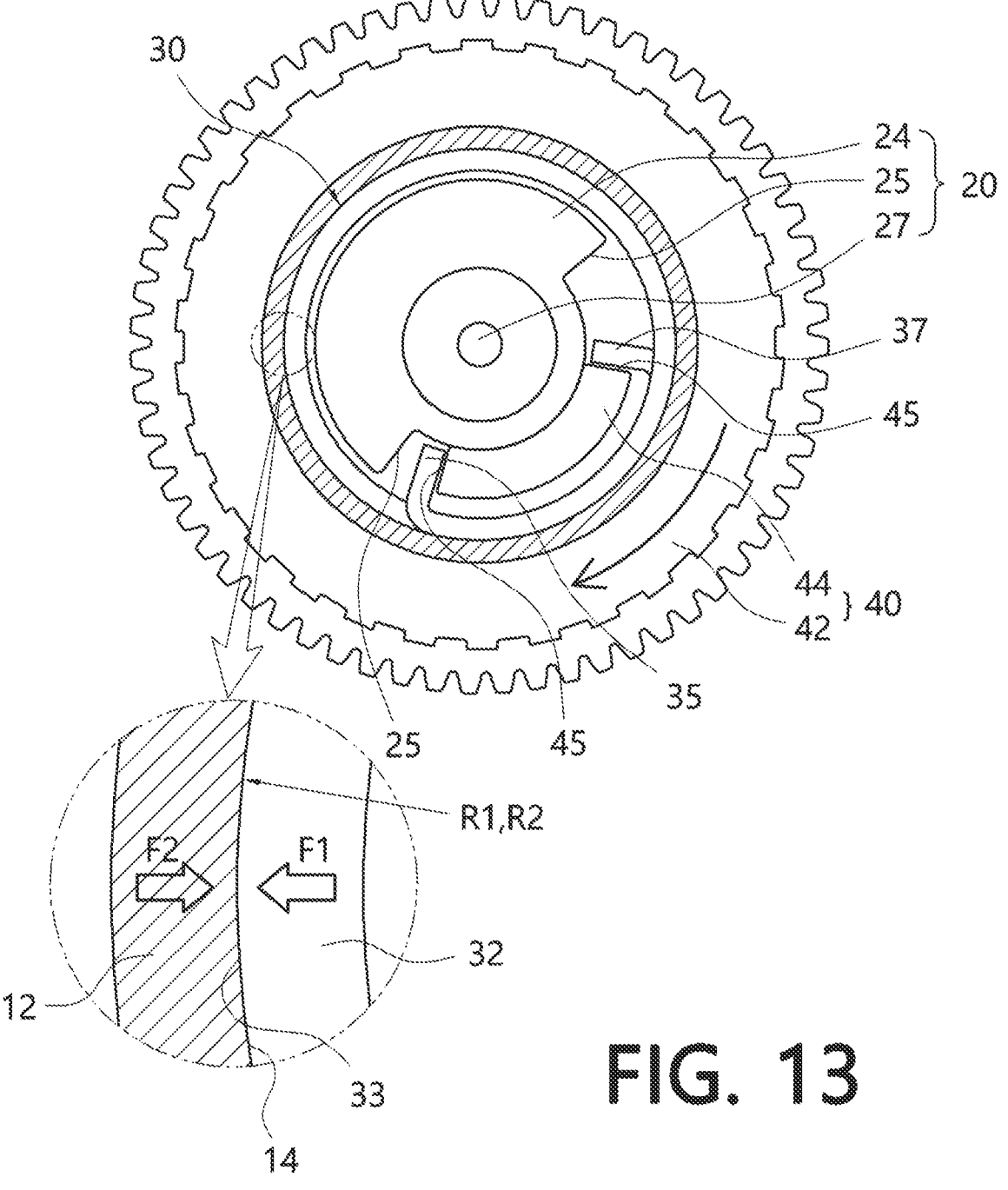
FIGS. 13 to 15 are views for explaining a process in which a brake pad is separated from a brake disc by a brake locking apparatus according to an embodiment of the present invention.
Figure 14:
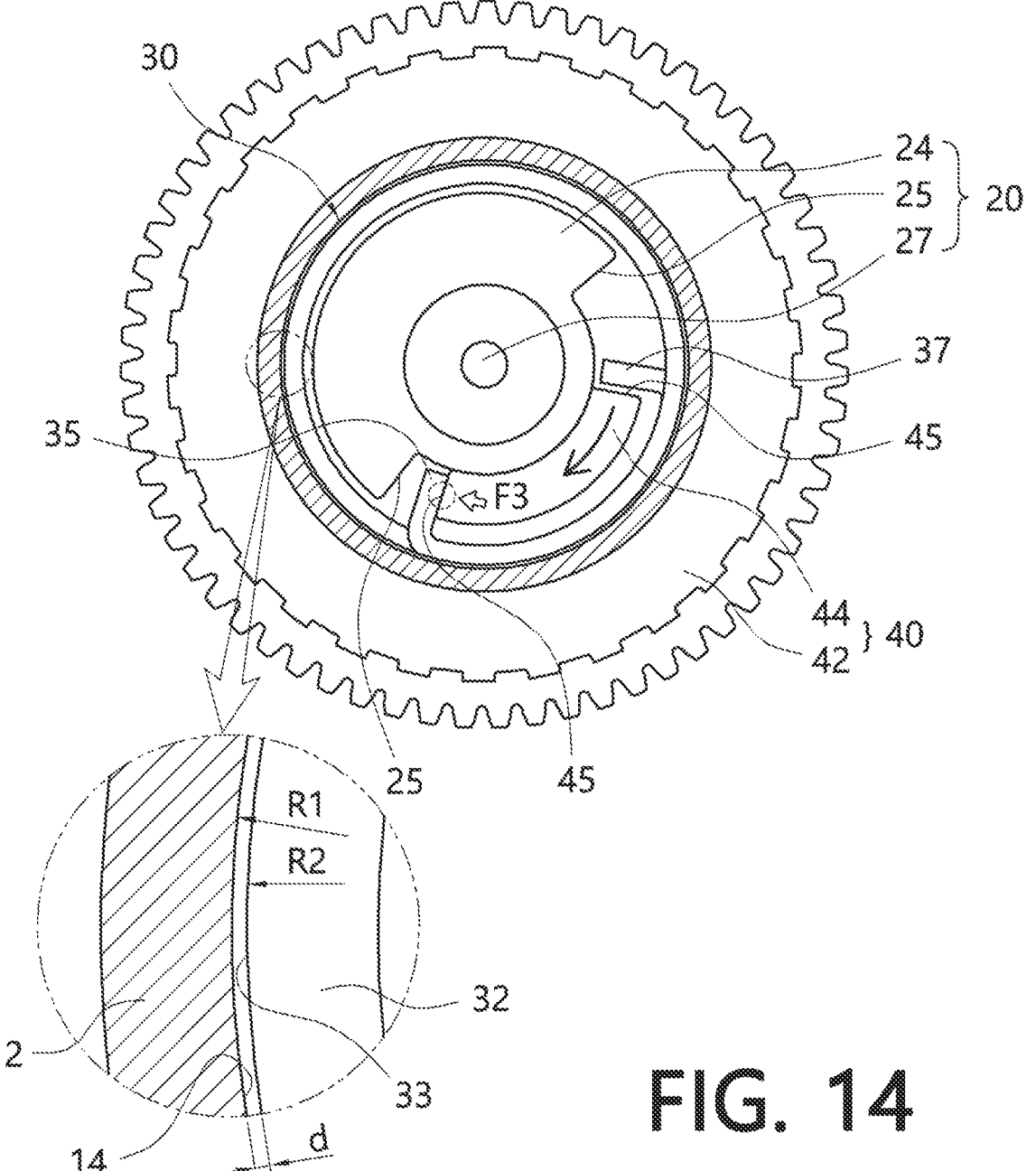
Figure 15:
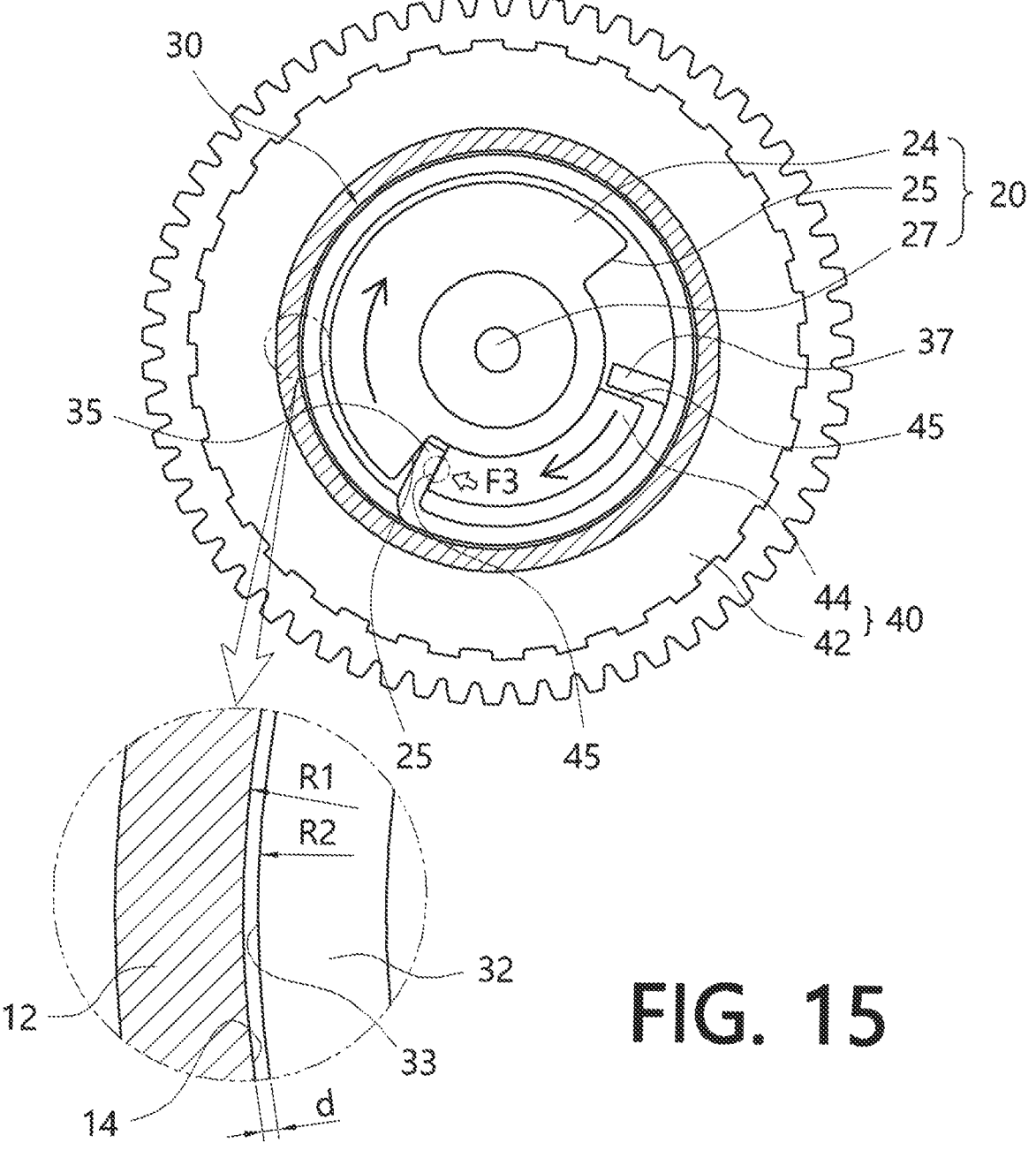

FIGS. 13 to 15 are views for explaining a process in which a brake pad is separated from a brake disc by a brake locking apparatus according to an embodiment of the present invention.

Referring to FIG. 13, when the second rotating member 40 is rotated in a direction opposite to the one direction (clockwise direction based on FIG. 13) by the actuator 50, the second protrusion 44 rotates toward the first bent part 35 of the elastic member 30. In this case, since the elastic member 30 may be press-fitted and installed inside the cover member 12, forces F1 and F2 pressing each other may act between the elastic member 30 and the cover member 12.

Referring to FIG. 14, when the first pressing surface 45 come into contact with the first bent part 35, a force F3 by which the second protrusion 44 presses the first bent part 35 acts. In this case, as described above, when the second protrusion 44 presses the first bent part 35, the outer diameter R2 of the spring part 32 may be reduced, and the outer circumferential surface 33 of the spring part 32 may be spaced apart from the inner surface 14 of the cover member 12 by a distance d.

Accordingly, normal force may no longer be generated between the outer circumferential surface 33 of the spring part 32 and the inner surface 14 of the cover member 12, and frictional force may not act on the outer circumferential surface 33 of the spring part 32. Accordingly, the elastic member 30 may freely rotate clockwise together with the second rotating member 40.

Referring to FIGS. 2 and 15 together, when the other side of the first bent part comes into contact with the first support surface 25 of the first rotating member 20, a force F3 by which the second protrusion 44 presses the first bent part 35 acts on the first support surface 25. Accordingly, the first rotating member 20 may be rotated clockwise. The rotation of the first rotating member 20 by the force F3 may be converted into a linear motion of the brake pad 3, and the brake pad 3 may move in a direction away from the brake disc 4.

As such, in the brake locking apparatus 1 according to an embodiment of the present invention, the actuator 50 may rotate the first rotating member 20 to move the brake pad 3 and release the activated state of the brake.

As discussed above, in the brake locking apparatus according to an embodiment of the present invention, as the reaction force applied to the brake pad increases, the frictional force between the elastic member and the inner surface of the housing increases. Accordingly, since the bent part is configured to limit the rotation of the first rotating member with a larger force, a large locking force can be efficiently generated.

In addition, since the brake locking apparatus according to an embodiment of the present invention is configured such that the bent part is formed toward the inside of the spring part to sufficiently separate the rotation central axis of the first rotating member and the bent part from each other, a large torque can be generated even with a small force, and a load applied to the locking apparatus can be minimized.

Although embodiments of the present invention have been described above, the spirit of the present invention is not limited to the embodiments presented in the subject specification; and those skilled in the art who understands the spirit of the present invention will be able to easily suggest other embodiments through addition, changes, elimination, and the like of elements without departing from the scope of the same spirit, and such other embodiments will also fall within the scope of the present invention.

The invention claimed is:

1. A brake locking apparatus for locking a position of a brake pad in a vehicle, the brake locking apparatus comprising:
   a housing;
   a first rotating member including: a first body part inside the housing configured to rotate in conjunction with movement of the brake pad, and a first protrusion including a first support surface extending radially outwardly from a first side of the first body part, wherein the first body part is cylindrical;
   an elastic member including: a spring part positioned on a circumferential side of the first body part and having an outer circumferential surface adjacent an inner surface of the housing, and a first bent part bent inwardly at a first end of the spring part to elastically support the first support surface;

a second rotating member configured to rotate the first rotating member to move the brake pad;
   an actuator configured to generate a driving force to rotate the second rotating member; and
   a power transmission member configured to transmit the driving force generated by the actuator to the second rotating member,
   wherein the second rotating member includes a second body part coupled to the power transmission member and a second protrusion extending from the second body part to an inner circumferential side of the spring part, and
   wherein the second protrusion includes a first pressing surface configured to press and rotate the first bent part and the first protrusion.

2. The brake locking apparatus according to claim 1, wherein the first rotating member includes a coupling part extending from the first body part, and
   the second body part includes a through hole through which the coupling part extends.

3. The brake locking apparatus according to claim 2, wherein the second protrusion extends along a circumference of the through hole.

4. The brake locking apparatus according to claim 1, wherein the power transmission member includes a worm wheel and a worm gear.

5. The brake locking apparatus according to claim 1, wherein the second protrusion has an arc shape, and
   the first end of the spring part extends in a circumferential direction along an outer circumferential surface of the second protrusion.

6. The brake locking apparatus according to claim 1, wherein the elastic member, the first rotating member, and the second rotating member are coaxially arranged around a rotation axis.

7. The brake locking apparatus according to claim 1, wherein the first protrusion includes a second support surface extending radially outwardly from a second side of the first body part,
   the elastic member includes a second bent part bent inwardly at a second end of the spring part to elastically support the second support surface, and
   the second protrusion includes a second pressing surface configured to press and rotate the second bent part and the first protrusion.

8. The brake locking apparatus according to claim 1, wherein the second protrusion includes a hooking part extending in a radial direction further than an outer diameter of the spring part, and
   wherein the hooking part is adjacent the elastic member to support the elastic member.

9. A brake locking apparatus for locking a position of a brake pad in a vehicle, the brake locking apparatus comprising:
   a housing;
   a first rotating member including: a first body part inside the housing configured to rotate in conjunction with movement of the brake pad, and a first protrusion including a first support surface extending radially outwardly from a first side of the first body part, wherein the first body part is cylindrical; and
   an elastic member including: a spring part positioned on a circumferential side of the first body part and having an outer circumferential surface adjacent an inner surface of the housing, and a first bent part bent inwardly at a first end of the spring part to elastically support the first support surface, wherein the first protrusion includes a second support surface extending radially outwardly from a second side of the first body part, and the elastic member includes a second bent part bent inwardly at a second end of the spring part to elastically support the second support surface, wherein the first protrusion is on a first portion of the circumferential side of the first body part and extends along a circumferential direction of the first body part, wherein the first protrusion has an arc shape, wherein an operating space is defined on a second portion of the circumferential side of the first body part between the first support surface and the second support surface and extends along the circumferential direction of the first body part, and wherein the first bent part and the second bent part are in the operating space.

10. The brake locking apparatus according to claim 9, wherein an arc length defined between the first support surface and the second support surface is greater than an arc length defined between the first bent part and the second bent part.

11. The brake locking apparatus according to claim 9, wherein the first end of the spring part extends in a circumferential direction along an outer circumferential portion of the operating space in a first direction toward the first bent part, and the second end of the spring part extends along the outer circumferential portion of the operating space in a second direction opposite the first direction toward the second bent part.

12. The brake locking apparatus according to claim 9, wherein the first protrusion includes a hooking part extending in a radial direction further than an outer diameter of the spring part, and wherein the hooking part is adjacent the elastic member to support the elastic member.

13. The brake locking apparatus according to claim 9, wherein the first bent part is perpendicular to an inner circumferential surface of the spring part.

14. A brake locking apparatus for locking a position of a brake pad in a vehicle, the brake locking apparatus comprising:

a housing;

a first rotating member including: a first body part inside the housing configured to rotate in conjunction with movement of the brake pad, and a first protrusion including a first support surface extending radially outwardly from a first side of the first body part, wherein the first body part is cylindrical; and an elastic member including: a spring part positioned on a circumferential side of the first body part and having an outer circumferential surface adjacent an inner surface of the housing, and a first bent part bent inwardly at a first end of the spring part to elastically support the first support surface, wherein an installation groove is defined in an inner wall of the housing, and the elastic member is press-fitted and installed inside the installation groove.

15. The brake locking apparatus according to claim 14, further comprising a planetary gear part coupled to each of the first rotating member and the brake pad.

* * * * *